United States Patent [19]

Zscheile, Jr. et al.

[11] Patent Number: 4,890,297
[45] Date of Patent: Dec. 26, 1989

[54] BURST JAMMER ERASURE CIRCUIT FOR SPREAD SPECTRUM RECEIVERS

[75] Inventors: John W. Zscheile, Jr., Farmington; Alan E. Lundquist, Salt Lake City; Billie M. Spencer, Bountiful, all of Utah

[73] Assignee: Unisys Corp., Blue Bell, Pa.

[21] Appl. No.: 259,660

[22] Filed: Oct. 19, 1988

[51] Int. Cl.$^4$ .......................... H04K 1/00; H04L 9/00
[52] U.S. Cl. ............................................ 375/1; 380/34
[58] Field of Search ................... 380/34; 375/1; 455/1

[56] References Cited

U.S. PATENT DOCUMENTS

| | | | |
|---|---|---|---|
| 4,164,628 | 8/1979 | Ward et al. | 375/1 |
| 4,291,410 | 9/1981 | Caples et al. | 375/1 |
| 4,435,822 | 3/1984 | Spencer et al. | 375/1 |
| 4,630,283 | 12/1986 | Schiff | 375/1 |

Primary Examiner—Salvatore Cangialosi
Attorney, Agent, or Firm—John B. Sowell; Robert S. Bramson; Mark T. Starr

[57] ABSTRACT

The present invention provides a novel burst erasing automatic gain control circuit which includes the basic elements of an automatic gain control circuit and further includes in the loop control circuit, slow response wideband filter means, and a hard limiter which limits the AGC'ed output from the amplifier so that the signal reaching the slow response wideband filter means never exceeds a predetermined value which would cause distortion in the feedback loop. The output of the novel automatic gain control circuit is coupled to a despreading circuit which removes substantially all of the remaining burst jamming signals.

10 Claims, 3 Drawing Sheets

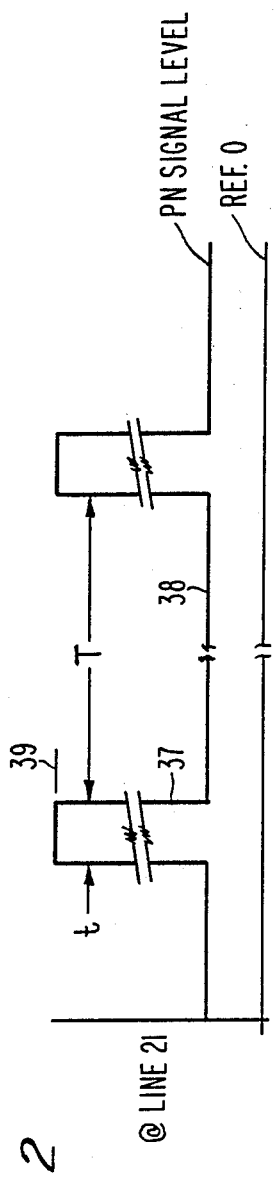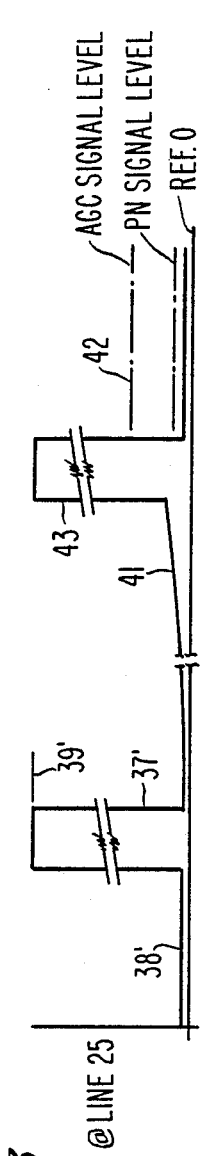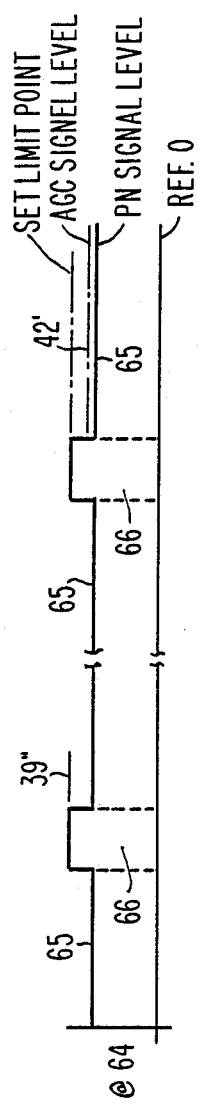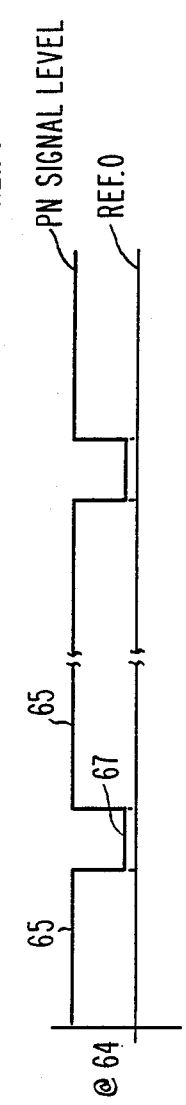

BURST JAMMER ERASURE CIRCUIT FOR SPREAD SPECTRUM RECEIVERS

BACKGROUND OF THE INVENTION

1. Field of the Invention

The present invention relates to spread spectrum receivers of the type used in military communications receivers. More particularly, the present invention is concerned with eliminating the harmful effects of burst jamming signals that are employed by unfriendly forces seeking to disrupt or interfere with communications signals being received at the spread spectrum receiver, and is equally effective in eliminating the effects of unintentional and/or friendly interference signals such as radar signals.

2. Description of the Prior Art

Our U.S. Pat. No. 4,435,822 shows and broadly describes a coherent spread spectrum receiver which employs automatic gain control (AGC) elements. The receiver shown in this patent without modification could be jammed by unfriendly burst signals. Prior art attempts to mitigate the effects of burst jamming have consisted of using (1) broadband limiters and (2) a burst detector coupled with a muting circuit. The purpose of the latter circuit is to shut-off the receiver during the burst period. Heretofore, limiters have had the desirable fast reaction time but are inherently single threshold devices which makes them ineffective for bursts that have markably different amplitudes. Another disadvantage of prior art limiters is that for other types of jammers, such as CW, FM, AM or noise, when limiting occurs, inband intermodulation products are generated that seriously deteriorate the desired signal.

The burst detector/muting circuit approach also is inadequate for coping with a burst jammer. This method again is essentially a fixed threshold device that limits its effectiveness against bursts of diverse amplitudes; in other words, there is a proper threshold for a given burst amplitude but this threshold will be wrong for other bursts with different amplitudes. In general, any threshold chosen to minimize the burst energy will be sufficiently low that signals, other than burst signals, will cause the circuit to false alarm at an excessive rate and thus lend the signal unusable. If the threshold is set high enough to avoid false alarm problems, then energy pulses which do not exceed the threshold will cause severe signal suppression along with an increased probability that many of the pulses will not be detected.

It would be extremely desirable to provide a burst suppression circuit that is fast, provides automatic threshold levels, will not false alarm against other types of jammers, is simple to implement, and may be retrofitted with a minor modification to existing receivers.

SUMMARY OF THE INVENTION

It is a principal object of the present invention to provide a novel gain control circuit for spread spectrum receivers which erases and/or eliminates burst jamming signals.

It is another principal object of the present invention to provide a novel automatic gain control circuit which may be embodied into new spread spectrum receivers or retrofitted into old spread spectrum receivers without further modification of the receiving circuits.

It is yet another principal object of the present invention to provide a novel burst jamming erasure circuit which is implemented by a modified automatic gain control circuit.

It is a general object of the present invention to provide a novel burst jamming erasure circuit which eliminates burst jamming signals without compromising the anti-jam capability of the receiver against all other types of jamming signals.

According to these and other objects of the present invention there is provided a novel automatic gain control circuit of the type adapted to be placed in the wideband section of a spread spectrum receiver following the antenna. The wideband slow response automatic gain control circuit comprises a variable attenuator coupled to the incoming signals and an amplifier coupled to the output of the variable attenuator. A hard limiter is coupled to the output of the amplifier. The output of the hard limiter is coupled to the output of the automatic gain control circuit and is coupled back through a detector and a slow response low bass filter in the loop control circuit to the input of the variable attenuator to provide both automatic gain control and hard limiting of the signal in the automatic gain control loop. The cut off level of the hard limiter provides an automatic threshold and is actuated only when a burst of interference is present. During all other times and against all other types of jammers and interference the hard limiter acts as a linear device within the AGC circuit.

BRIEF DESCRIPTION OF THE DRAWINGS

FIG. 2 is a waveform diagram showing a burst of energy representative of a burst jamming signal being received at the input of the automatic gain control circuit of FIG. 1;

FIG. 3 is a waveform diagram showing a burst of jamming signal energy which would occur at the output of the prior art automatic gain control circuit of FIG. 1;

FIG. 5 is a waveform diagram showing a burst of energy at the output of the novel automatic gain control circuit of FIG. 4; and FIG. 6 is a waveform diagram showing a burst of energy after passing through the despreading means and after erasing the burst jamming signal.

DESCRIPTION OF THE PREFERRED EMBODIMENT

Figure 1:
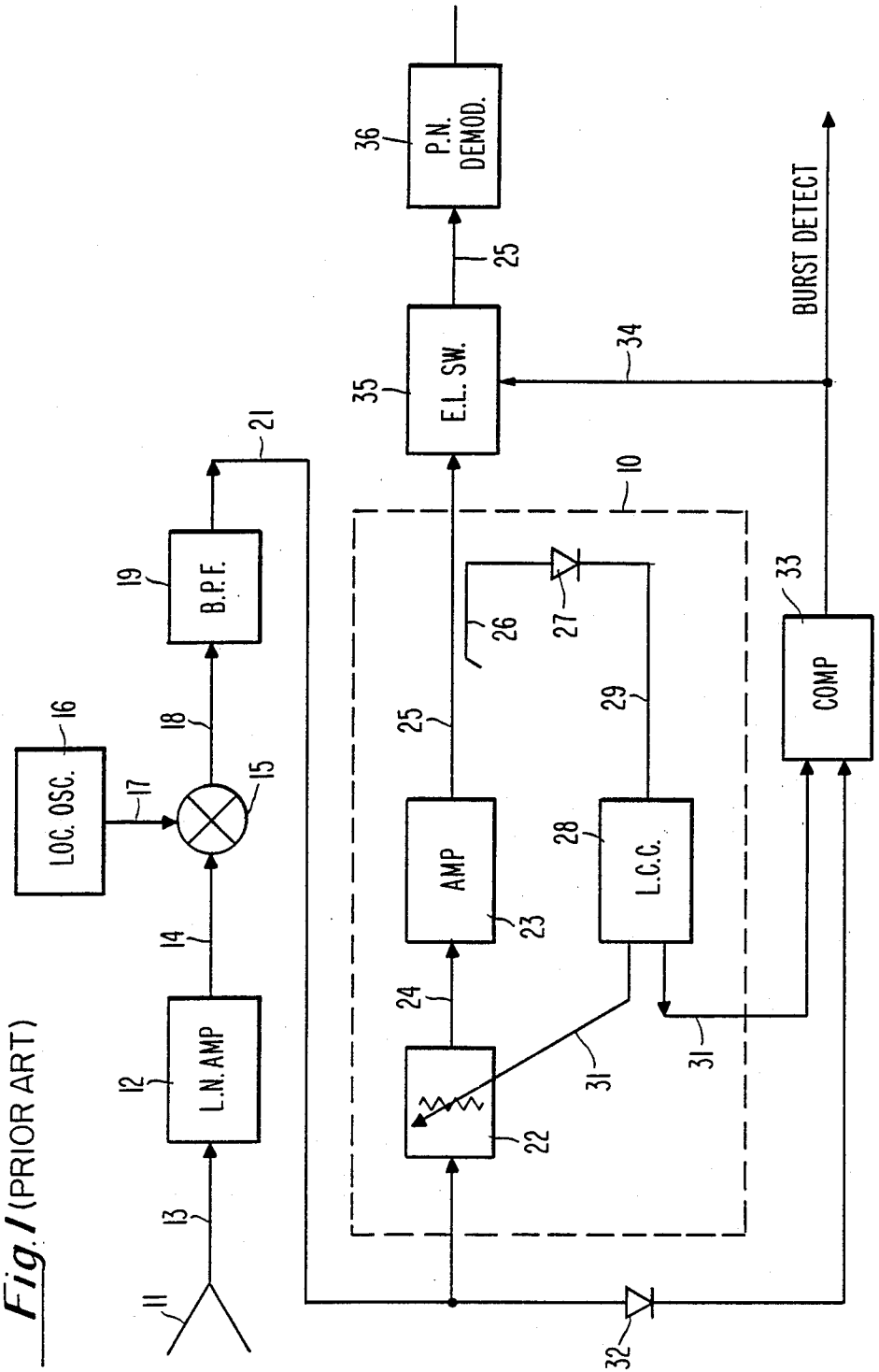
FIG. 1 is a schematic block diagram of a prior art automatic gain control circuit of the type employed in spread spectrum receivers.

Refer now to FIG. 1 showing a schematic block diagram of a prior art type automatic gain control circuit employed in a spread spectrum receiver. The slow response automatic gain control circuit 10 is shown coupled from an antenna 11 and connected to a low noise amplifier 12 by line 13 to provide an amplified output on line 14 to mixer 15. The second input to mixer 15 from local oscillator 16 on line 17 produces a down converted output on line 18 which is applied to bandpass filter 19 to produce a filtered down converted output on line 21 which is applied to the input of the prior art automatic gain control circuit 10 which comprises a variable attenuator 22 coupled to an amplifier 23 via line 24 to provide an amplified output of the automatic gain control circuit on line 25. The output of the automatic gain control circuit is coupled through a coupling element 26 and a diode 27 to a slow response loop control circuit 28 via line 29. The output of the control circuit 28 on line 31 is employed to control the variable attenuator 22 as is well known in the prior art. This prior art AGC circuit may be modified by connecting the output line 31 and the input line 21 (through a diode 32) to a comparator 33 to produce an output signal on line 34 which is indicative of a rapid change in energy at the input 21 to the automatic gain control circuit 10 and may be employed as a burst detecting signal. The burst detecting signal on line 34 is applied to an electronic switch 35 to interrupt the output on line 25 during the duration of the detection of the burst of energy. The output from the automatic gain control circuit 10 is then applied to a PN demodulating circuit 36 of the type shown in our U.S. Pat. No. 4,435,822.

Refer now to FIG. 2 showing a waveform diagram representing a burst of energy being applied to the input 21 of the automatic gain control circuit 10. The pulse or burst of energy 37 is shown starting at a signal level 38 slightly above the reference zero and having a peak or energy level 39 which is several orders of magnitude above the signal level 38. For purposes of this discussion, the time duration of the burst jamming signal is shown as time "t" which is a short duration relative to time "T" between pulses.

Refer now to FIG. 3 showing a waveform diagram of the pulse at the output of the AGC 10. Before describing the waveform 37' it will be understood that the function of the automatic gain control diminishes, attenuates or squeezes down the pulse 37' to a predetermined level which is proportional to the pulse 37 at the input of the AGC circuit. Thus, the input signal level 38' is above the reference zero levels, a distance proportional to the height of the peak 39' with respect to the height of the peak 39. The AGC output signal level 42 is shown being slightly lower than the peak 39'. After the duration of the peak 39' the voltage level drops substantially to the PN signal level 38' and slowly rises as shown by the portion of the waveform 41 until the next following burst jamming signal 43 arrives. The portion of the waveform 41 illustrates the averaging and slow response of the loop control circuit 28 in the AGC loop 10. This clearly illustrates that the slow response time of the AGC loop does not have sufficient time to recover between bursts of energy 37' and 43 to recover to the AGC output signal level 42. Thus, the information being received as attenuated to the point where it can neither be demodulated nor decoded. Stated differently, even though the burst jamming energy is separated by time T it is sufficient to affect the output signal on line 25 when the burst is not occurring.

Figure 4:
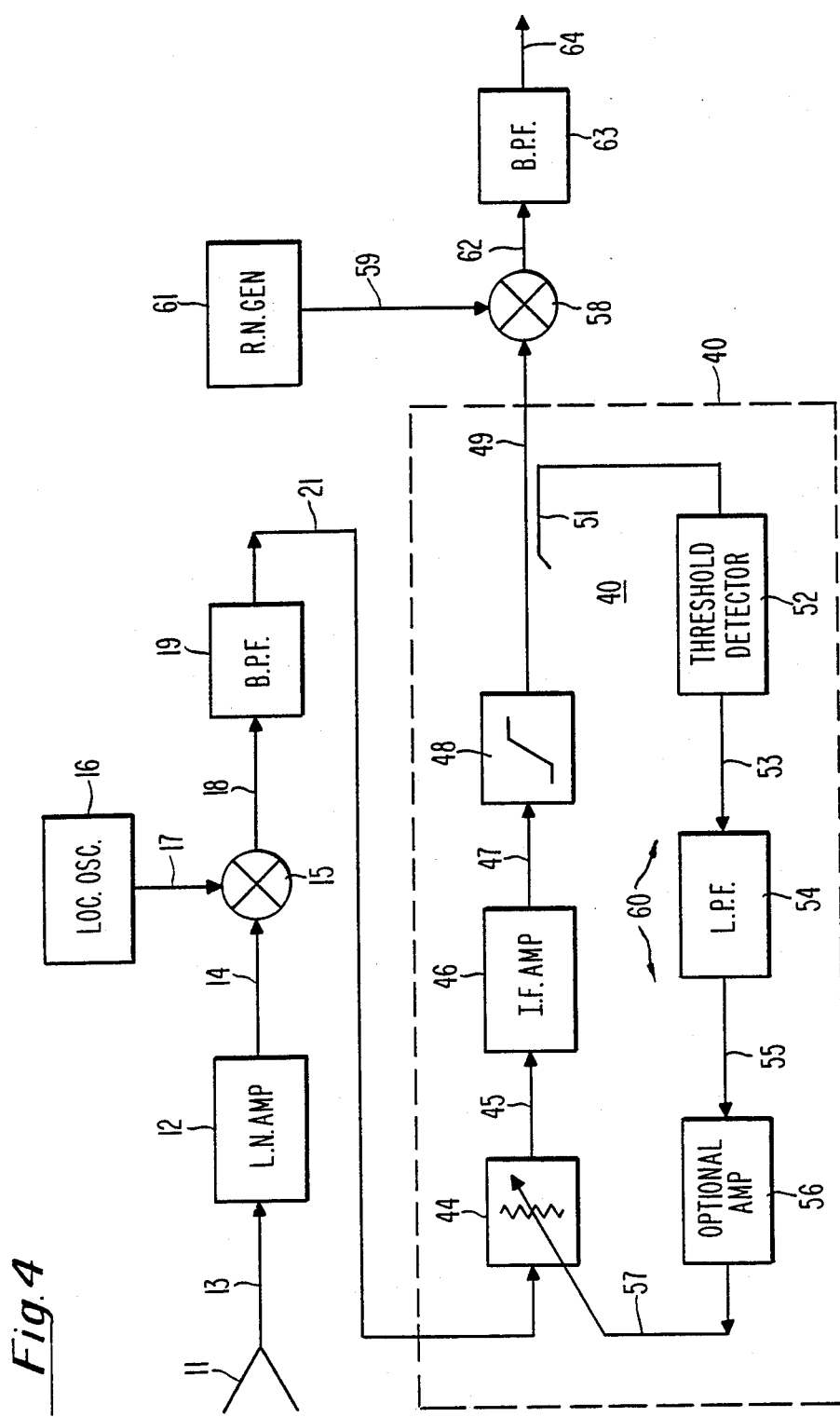
FIG. 4 is a block diagram of the preferred embodiment of the present invention showing a burst erasing automatic gain control circuit.

Refer now to FIG. 4 showing a block diagram of the preferred embodiment of the present invention novel automatic gain control circuit 40 having the same elements, numbered the same as FIG. 1, comprising the input to the automatic gain control circuit 40. The signal on line 21 is applied to a variable attenuator 44 having an output on line 45 which is applied to an IF amplifier 46. The output of the IF amplifier 46 on line 47 is applied to a hard limiter 48 which limits burst energy only during signal duration to produce the hard limited output of the AGC on line 49. The output on line 49 is coupled through coupling means 51 to a threshhold detector 52 which is employed to set the output threshhold level on line 49. The output of detector 52 on line 53 is applied to a slow response lowpass filter 54 to produce the filtered output on line 55 which may optionally be amplified in amplifier 56 to produce the control signal on output line 57 that controls the signal output level on line 45 to assure that the threshhold value set for line 49 is maintained. Elements 52, 54 and 56 operate as a loop control circuit (LCC) 60 on a manner similar to the prior art LCC 28 of FIG. 1. The AGC output on line 49 is applied to mixer 58 along with a PN generated signal on line 59 from generator 61 to produce a despread signal on line 62. The signal on line 62 is applied to bandpass filter 63 that removes the burst jamming power that has passed through the AGC circuit and appears on line 49. The despread signal on line 64 that has the burst jamming signal erased or removed is coupled to the demodulator of the receiving circuit for data detection.

For purposes of this discussion, the aforementioned input signals being applied on input line 21 of FIG. 1 are also being applied to input line 21 of FIG. 4 to produce the signals which will be described with reference to FIGS. 5 and 6.

Refer now to FIG. 5 which shows the waveforms produced on output line 49 as a result of the input pulse 37 on line 21. The AGC level is shown as a level 42' which for purposes of this discussion has been set as the same level as the AGC in the prior art FIG. 1. Now, however, the PN signal level 65 is at or near the AGC level 42' and is only slightly below the peak 39" which is well below the peak or limit point 39 shown in FIG. 2. By removing the burst of energy at the hard limiter 48, the automatic gain control is no longer predominantly controlled by the burst jamming signal level 39. It will be understood that the burst level 39 at the input of the novel AGC circuit is tens of thousands times greater than the limited level 39" being passed through the automatic gain control circuit 40. Even though the signals represented in the pulses 66 are proportionately reduced the desired signal is unusable and is erased or eliminated. The signal on either side of the burst jamming pulses 66 is usable.

Refer now to FIG. 6 showing the signal levels at the output line 64 after despreading. The PN signal level 65 has been proportionately squeezed down or suppressed by a factor greater than ten thousand to one and occurs as level 67, however, the usable signal level 65 has not been suppressed on either side of the burst pulse which was eliminated and occurs as signal level 65. It will be understood that the usable signal level 65 occurs during the time T between burst and is error free and with proper coding, the original complete signal, including the erased signal, can be recovered essentially error free.

Having explained a preferred embodiment of the present invention, it will be understood that the novel AGC circuit 40 shown in FIG. 4 may be implemented using only one or two functional elements more than the prior art AGC circuit and may be used as a retrofit circuit in existing spread spectrum receivers or employed in present spread spectrum receivers to bring old and new circuits up to the new state of the art.

What we claim is:

1. A burst erasing automatic gain control (AGC) circuit for a spread spectrum receiver comprising:
   variable attenuation means adapted to receive wideband spread spectrum signals subject to burst jamming signals,
   amplifier means coupled to the output of said attenuation means, limiting means coupled to the output of said amplifier means for limiting the AGCed output signal to a level slightly above the desired AGC output level, a loop control circuit coupled to said AGC ouput signal for setting the desired (AGC) output signal level, said output of said loop control circuit being coupled to said variable attenuation means for controlling said desired AGC output signal level, and despreading means coupled to the output of said limiting means for erasing substantially all of said burst jamming signals without destabilizing said automatic gain control circuit.

2. A burst erasing AGC circuit as set forth in claim 1 wherein said limiting means comprises a hard limiter set to a limit point that operates only on high energy burst signals.

3. A burst erasing AGC circuit as set forth in claim 1 wherein said variable attenuation means comprises a voltage control attenuator.

4. A burst erasing AGC circuit as set forth in claim 1 wherein said loop control circuit comprises a lowpass filter.

5. A burst erasing AGC circuit as set forth in claim 4 wherein said loop control circuit further includes a second amplifier connected between the output of said low pass filter and said attenuation means.

6. A burst erasing AGC circuit as set forth in claim 2 wherein said hard limiter is set to remove substantially all of burst signal energy in excess of said signal level.

7. A burst erasing AGC circuit as set forth in claim 6 wherein said hard limiter is set to remove at least 95% of said burst signal energy.

8. A burst erasing AGC circuit as set forth in claim 1 wherein said limiter means operates as a linear device on all types of jammer and interference signals which are constant in amplitude and operates to provide an automatic predetermined threshold against burst jamming signals.

9. A burst erasing AGC circuit as set forth in claim 2 wherein said hard limiter cut off level limit point is higher than said slow response AGC output signal level, thus, minimizing supression of the desired signal during non burst periods.

10. A burst erasing AGC circuit as set forth in claim 9 wherein said hard limiter cut off level is insensitive to the magnitude of the burst signal level.

* * * * *